Dec. 26, 1950           C. L. GENESEN           2,535,407
STATIONARY SAFETY JACK
Filed Nov. 26, 1947
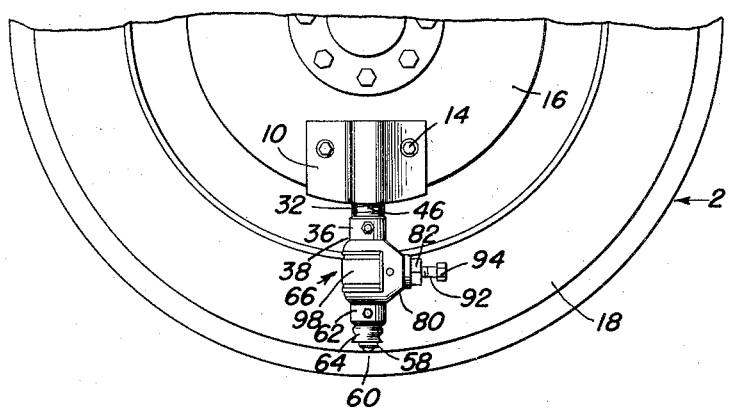
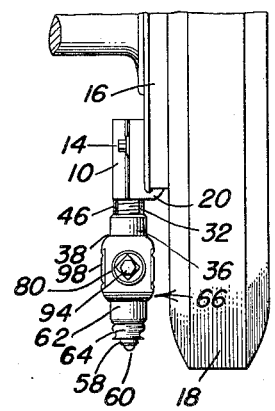
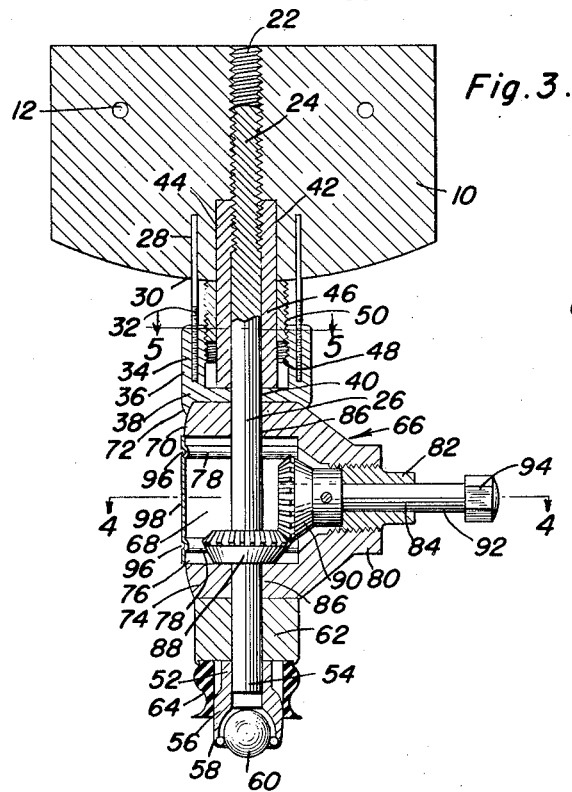
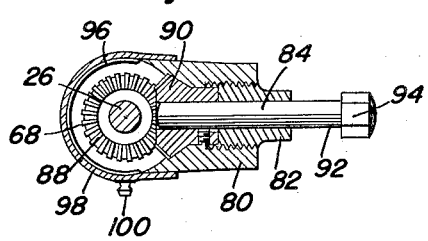
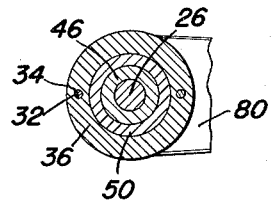
Charles L. Genesen
INVENTOR.

Patented Dec. 26, 1950

2,535,407

UNITED STATES PATENT OFFICE 2,535,407

STATIONARY SAFETY JACK

Charles L. Genesen, Argo, Ill.

Application November 26, 1947, Serial No. 788,197

2 Claims. (Cl. 254—86)

This invention relates to the useful improvements in jacks and the primary object of the present invention is to provide a jack so designed as to facilitate the same to be quickly and readily applied to the brake drum housing of a vehicle, so that the same will be conveniently accessible for raising the vehicle on which the same is attached, when a tire of the vehicle becomes deflated.

Another important object of the present invention is to provide a safety jack applicable for stationary attachment to the brake drum housing of a vehicle and including novel and improved bearing means carried by the same for engaging a ground surface when the jack is actuated for raising the vehicle.

A further object of the present invention is to provide a safety jack that is extremely small and compact in structure and which is so located relative to a vehicle that the same may be easily actuated to effect a raising of the vehicle when desirable.

A still further aim of the present invention is to provide a stationary safety jack that is simple and practical in construction, strong and reliable in use, neat and attractive in appearance, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a fragmentary side elevational view, looking from the inside, of a vehicle wheel, and showing the present jack applied thereto;

Figure 2 is a rear elevational view of Figure 1, taken substantially in the direction of arrow numbered 2 in Figure 1;

Figure 3 is an enlarged side elevational view of the present jack structure, and with parts thereof broken away and shown in section for the convenience of explanation;

Figure 4 is a transverse horizontal sectional view taken substantially on the plane of section line 4—4 of Figure 3; and Figure 5 is a fragmentary transverse horizontal sectional view taken substantially on the plane of section line 5—5 of Figure 3.

Referring now to the drawings in detail, wherein for the purpose of illustration, there is disclosed a preferred embodiment of the present invention, the numeral 10 represents a substantially rectangular base having transverse openings 12 that engage suitable fasteners 14 for removably securing the base to the outer face of a vehicle brake drum housing 16, adjacent a wheel 18. Projecting outwardly from the lower end of the base 10, is a bearing ear or lift lug 20 that frictionally engages the lower periphery of the brake drum housing 16.

The base 10 is provided with an internally threaded central and vertical bore 22 that receivably engages the externally threaded end portion 24 of a depending vertical support rod or lift arm 26.

Fixedly mounted in vertical recesses 28 provided in the base 10, adjacent the bore 22, is a plurality of hanger rods 30 having threaded lower ends 32 that receivably engage threaded openings 34 provided in the upstanding annular flange portion 36 of an upper spacer collar 38 that is suitably fixed on said support rod 26. This spacer collar 38 is provided with a central aperture 40 that loosely engages the support rod 26.

Rigidly secured in an annular recess 42 provided in the lower end of the base 10, adjacent bore 22, is the upper end portion 44 of a depending sleeve or bearing 46 that loosely embraces a portion of the support rod 26. The lower extremity of this sleeve 46 frictionally bears against the upper inner face of the collar 38 and is disposed in placed relationship relative to the annular flange portion 36 of said collar 38.

Receivably engaging the internal threads 48 of the flange portion 36, is an externally threaded ring or annular guide 50 that embraces the sleeve 46 with its upper extremity normally frictionally bearing against the lower end of the base 10. The numeral 52 represents a bearing element support or sleeve-like member that is removably secured on the lower end 54 of the support rod 26. This member 52 is provided with a socket 56 that projects downwardly from the end 54 of the support rod 26, and in which there are suitably positioned friction balls 58 that frictionally bear against the other periphery of a spherical bearing element 60, a portion of which is positioned or seated in the socket 56.

Frictionally bearing on the upper end of the member 52, is the lower end of a lower spacer collar 62 that loosely embraces the lower portion of the support rod 26, adjacent the member 52. This lower collar 62 is provided with a suitable fastener for fixedly securing the same relative to the support rod 26. Fixed to the lower end of the collar 62, is one end of a resilient guard sleeve 64 which normally embraces the member 52 and the socket end 56 thereof.

The numeral 66 represents a housing generally, comprising a central chamber 68, an annular flat upper wall 70 that is frictionally embraced by an annular flange or rib 72 depending from the lower end of collar 38, a flat annular lower wall 74 that frictionally bears upon the upper end of the collar 62, an opening 76 in one side communicating with chamber 68 and having an upper and lower channeled groove 78, and an internally threaded nipple or sleeve-like projection 80 in one end that receivably engages a bearing sleeve 82 rotatably supporting an actuating shaft 84. The walls 70 and 74 of the housing 66 are provided with aligned openings 86 received the support rod 26 and permitting rotation of the housing 66 on the rod 26.

Fixed on the support rod 26 and positioned in chamber 68, is a beveled driven gear 88 that engages a beveled drive gear on the inner end of the shaft 84. The other end 92 of the shaft 84 projects outwardly from the sleeve 82 and is provided with a suitable wrench engaging element 94, whereby the shaft 84 may be actuated for vertical adjustment of the support rod 26 relative to the base 10.

Frictionally or yieldingly engaging the channeled groove 78, adjacent the chamber 68, are the arcuate detents or ribs 96 of a substantially U-shaped closure plate 98 for the opening 76. This plate 98 supports an inlet nipple or alimite fitting 100 for supplying a lubricant to chamber 68 and more particularly to the gears 88 and 90 positioned in said chamber.

In practical use of the device, by actuating the shaft 84, the support rod 26 may be raised and lowered so that the bearing element 60 will engage the ground surface to jack or lift the wheel 18 from the ground surface. Obviously, when not in use, the support rod 26 is actuated so that the same will extend in its uppermost position relative to the base 10 so that the spherical bearing element 60, supported by the support rod 26, will be raised relative to the surface over which the vehicle is passing whereby the same will not engage obstacles or rough portions of the surface over which the vehicle is passing.

In view of the foregoing description taken in conjunction with the accompanying drawings it is believed that a clear understanding of the device will be quite apparent to those skilled in this art.

A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention, what is claimed as new is:

1. A jack attachment for vehicles comprising a base, means for removably fixing said base relative to a brake drum housing, said base having an internally threaded bore, a support threaded at one end for adjustably engaging said bore, a journal bearing embracing said support, means connecting said journal bearing to said base, a housing in which said support is rotatably mounted, said housing being movable vertically with said support, a removable closure for said housing, a driven gear fixed on said support and disposed within said housing, an actuating shaft rotatably mounted on said housing and movable with said housing, a drive gear carried by said shaft operatively engaging said driven gear, and a bearing element carried by the lower end of said support and adapted to engage the ground when the support is rotated in one direction.

2. A jack attachment for vehicles comprising a base, means for detachably securing said base to a brake drum housing, said base having an internally threaded bore, a lift arm having an externally threaded portion receivably engaging the bore, a housing embracing said arm and journaled for rotation on said arm and movable with said arm, a driven gear mounted on said arm, a shaft journaled for rotation on said housing and movable with said housing, and a drive gear carried by said shaft engaging said driven gear.

CHARLES L. GENESEN.

REFERENCES CITED

The following references are of record in the file of this patent:

UNITED STATES PATENTS

| Number | Name | Date |
|---|---|---|
| 1,416,633 | Gutman | May 16, 1922 |
| 1,794,675 | Dennert | Mar. 3, 1931 |
| 1,873,116 | Dessaint | Aug. 23, 1932 |
| 1,937,170 | Smith | Nov. 28, 1933 |